United States Patent Office 2,772,246
Patented Nov. 27, 1956

2,772,246

CELLULAR PHENOL ALDEHYDE PLASTIC RESINS

Eli Simon, Los Angeles, and Frank W. Thomas, Burbank, Calif., assignors to Lockheed Aircraft Corporation, Burbank, Calif.

No Drawing. Application August 6, 1952, Serial No. 302,996

14 Claims. (Cl. 260—2.5)

This invention relates to new and useful products in the nature of foamed synthetic resins and relates more particularly to cellular phenol-aldehyde resins and to methods of making the same.

Cellular phenolic resin products were introduced prior to our invention but so far as we are aware these earlier products could not be produced satisfactorily in large sections or masses. When attempts were made to foam or cast these products in large and relatively large monolithic sections, the cell structure was irregular and unsatisfactory. In most instances excessively large voids were formed in the material, weakening it and making it unsuitable for many applications. This non-uniformity in cell structure and, therefore, in strength and insulating characteristics, resulted from the excessively rapid rate of gas evolution and polymerization of the resin during the foaming reaction. When the rate of reaction is excessively rapid the walls of the gas-filled cells become thin at the regions of mutual contact of the cells and the continuing evolution of the gas ruptures the cells before the resin has polymerized sufficiently to resist such rupture, the rupturing of the cells being progressive so that large voids or pockets are left in the material or product. Although this action is more pronounced in large masses or sections, it also occurs in smaller pours or masses where the rate of reaction of the reactant mixture is uncontrolled and too rapid.

It is an object of the present invention to provide low density foamed or cellular phenolic resin products that are substantially uniform in cell structure. The products of the invention have substantially uniform cells throughout and do not have the overly large voids or cells which have characterized the earlier phenolic resin foams.

It is another object of the invention to provide for the pouring or casting of cellular phenolic resin products in large and relatively large masses or sections without the development of excessively large voids therein.

Another object of the invention is to provide foaming compositions and a method for producing cellular phenolic products of selected cell size, density, etc. In accordance with the present invention the rate of reaction of the foam producing reactant mixture is controlled so as to permit the ready manufacture of phenolic resin foams of varied and selected characteristics, cell sizes and composition, the slow or controlled rate of reaction permitting the use of preferred and selected concentrations of constituents and constituents or ingredients for obtaining foamed or cellular products of substantially different and desired physical characteristics without the creation of large voids, discontinuities or excessive irregularity of cell structure.

Another object of the invention is to provide foaming phenolic resin compositions that react slowly and in a controlled manner to facilitate pouring, spreading, working and handling and that produce cellular products of generally uniform cell structure throughout. The foaming compositions of the invention are characterized by novel catalysts in combination with gassing agents, such as divided aluminum and the like. The foamed or cellular materials are the products of mutual or dual reactions; that is (1) an initial reaction between a special acid catalyst and a selected gassing agent such as a divided metal, and (2) a second reaction occurring during the first and increasing the chain length of the phenol alcohols formed during reaction of the resol type phenolic resins employed in the composition, the chain length growing at a controlled or slow rate as a result of the acid blend constituting the catalyst, one acid serving to reduce or slow down the rate of reaction of the other. The nature of the blend of acids, and the diluent, which may be incorporated in the catalyst, together with the character of the gassing agent contribute to the controlled foaming reaction of the reactant phenolic resin mass to produce a product having uniform cell structure throughout even in large sections and distinguishing from prior products of this general character wherein the reaction is uncontrolled and the product is non-uniform in cell structure. We have found that identical or comparable results and foamed products may be obtained by employing catalysts including or prepared from (a) prereacted organic esters of acids derived from the oxides of phosphorous plus a mineral acid, or (b) a blend of unreacted ester components such as a polyhydric alcohol and a selected acid derived from an oxide of phosphorous plus a mineral acid or (c) a blend of a prereacted organo phosphoric acid ester and one or more unreacted ester components such as a polyhydric alcohol and/or phosphoric acid, with or without a mineral acid.

A further object of the invention is to provide foaming compositions of the character mentioned incorporating a phosphatide which improves the physical strength characteristics of the cellular products. The inclusion of a selected proportion of the phosphatide in the reactant foaming mixture has been found to regulate or adjust the wall thickness of the cells of the foam to the end that the cells are somewhat larger in size, more uniform in size and have greater wall thickness so that the foamed or cellular product has greater uniformity and superior physical strength characteristics.

Other objects and features of the present invention will become apparent to those skilled in the art from the following detailed description.

In preparing the cellular or foamed plastic materials of the invention we employ an acid catalyzable water miscible phenolaldehyde resol, a gassing agent and a special acid catalyst.

The phenol-aldehyde resol or resols employed in the reactant foaming compositions of the invention are primarily derived from the reaction of phenols and aldehydes. We will herein describe several typical examples of resols suitable for use in preparing the foamed or cellular materials of the invention although we do not wish to be limited to these specific examples. The phenolic resins or resols are acid catalyzable and water miscible, have a specific gravity of between 1.15 and 1.35 and a pH of about 7 and are the reaction products of a phenolic compound, an aldehyde and an alkaline catalyst. The following are illustrative formulations of phenol-aldehyde resols suitable for incorporation in the reactant mixtures or compositions of the invention:

RESIN 1

| | |
|---|---|
| Phenol | 1 mol. |
| Formaldehyde | 1 to 2.5 mols. |
| Barium hydroxide 8H$_2$O | 0.003 to 0.020 mol. |

RESIN 2

| | |
|---|---|
| Para-isopropyl phenol | 1 mol. |
| Formaldehyde | 1 to 2.5 mols. |
| Calcium carbonate | 0.003 to 0.020 mol. |

RESIN 3

| | |
|---|---|
| Phenol | } 1 mol total (the parachloro phenol being in the proportion of from 5 to 75% by mol weight). |
| Parachloro phenol | |
| Formaldehyde | 1 to 2.5 mols. |
| Barium hydroxide 8H₂O | 0.003 to 0.020 mol. |

RESIN 4

| | |
|---|---|
| Phenol | 1 mol. |
| Formaldehyde | } 1 to 2.5 mols total (the furfural being in the proportion of from 5 to 50% by mol weight). |
| Furfural | |
| Barium hydroxide 8H₂O | 0.003 to 0.020 mol. |

RESIN 5

| | |
|---|---|
| Phenol | 1 mol. |
| Methyl ethyl ketone | 0.5 to 1 mol. |
| Formaldehyde | 1 to 2.5 mols. |
| Barium hydroxide 8H₂O | 0.003 to 0.020 mol. |

RESIN 6

| | |
|---|---|
| Phenol | 1 mol. |
| Formaldehyde | 1 to 2.5 mols. |
| Polyvinyl alcohol | 1 to 15% by weight of the total weight of the phenol and formaldehyde. |
| Barium hydroxide 8H₂O | 0.003 to 0.020 mol. |

RESIN 7

| | |
|---|---|
| Phenol | 1 mol. |
| Furfural | } 1 to 2.5 mols total (the furfural being in the proportion of from 5 to 50% by mol weight). |
| Formaldehyde | |
| Polyvinyl alcohol | 5 to 50 grams. |
| Barium hydroxide 8H₂O | 0.003 to 0.020 mol. |

RESIN 8

| | |
|---|---|
| Phenol | } 1 mol total (the resorcinol being in the proportion of from 5 to 75% by mol weight). |
| Resorcinol | |
| Formaldehyde | 1 to 2.5 mols. |
| Barium hydroxide 8H₂O | 0.003 to 0.020 mol. |
| Polyvinyl alcohol | 1 to 15% by weight of the combined weight of the other components. |

The formaldehyde used in preparing the above phenol-aldehyde resols is preferably in the form of an aqueous solution having a formaldehyde concentration of from 30 to 40% by weight and usually about 37% by weight. In preparing the reactant mixtures or formulations of the invention the phenol-aldehyde resols, such as above described, may be used separately or in selected blends or mixtures. The phenol-aldehyde resol or the blend thereof is used in the proportion of from about 60% to about 90% by weight of the total reactant mixture.

The gassing agent or agents used in preparing the cellular phenolic products are preferably metals, such as aluminum, zinc, iron or magnesium in divided form or may be water soluble substances that will evolve gas while in contact with the water soluble acidic part of the catalyst, to be described below. Aluminum, zinc, iron or magnesium, preferably in atomized form of from 600 to 200 mesh employed individually or in suitable mixtures are effective as gassing agents as are these metals in the form of leafing powders of the same or comparable mesh. Sodium bicarbonate, potassium bicarbonate, lithium bicarbonate, sodium carbonate, potassium carbonate, lithium carbonate, ammonium carbonate, sodium nitrite, potassium nitrite, and the like, may be used as the gassing agent in place of the divided metal or metals enumerated above. It is usually preferred to employ the desired or selected divided metal or combination of metals as they have been found to produce superior results. The gassing agent is used in the formulations of the invention in the proportion of from 0.2 to 10% by weight of the total mixture.

We have discovered that modifiers in the form of ester phosphatides impart desirable physical characteristics to the products of the invention. These additives or modifiers increase the physical strength of the cellular products and aid in obtaining uniform cell structures. The ester phosphatides assist in controlling the initial foaming rate, produce somewhat larger cells and by regulating the cell wall thickness of the foam assure a physically stronger product. The ester phosphatides include lecithin and cephalin (kephalin) and are used in the proportion of from 1/8 to 10% and preferably 1/2 to 5% by weight of the total mixture.

The catalysts of the invention are mixtures or blends of acids in aqueous solutions. The acids of the blends are (1) acids derived from the oxides of phosphorous and their organic esters and (2) selected mineral acids or unsubstituted acids of oxides of phosphorous. In addition the catalysts include certain selected diluents and water, the water preferably occurring as the carrier for the diluents themselves and/or the acids. The catalysts are characterized in part by alkyl or aryl or alk-aryl esters of certain classes of phosphoric acids. The alkyl and aryl groups act as modifying agents for the phosphoric acid and may be represented as follows:

1. $RH_2PO_4$
2. $R_2HPO_4$
3. $RR_1HPO_4$
4. $R_2H_2P_2O_7$
5. $R_xH_yP_3O_{10}$
6. $R_zH_w(PO_4)_2$ where $x+y=5$, $z+w=6$, $y=1$ or greater than 1, $w=1$ or greater than 1, and where R represents:

(a) Alkyl groups from methyl to stearyl and preferably from methyl to lauryl and except for methyl having straight or branch chains.
(b) Substituted alkyl groups similar to (a) or substituted aryl groups.
(c) Aryl groups such as phenyl, napthyl, acenapthyl.
(d) Combinations of (a) (b) (c).

The substitution in (b) and (c) may comprise halogen, nitro, or carboxyl groups.

Examples of these modified organo phosphoric acids are:

1. Glycero phosphoric acid
2. Di-methyl-acid-pyrophosphate
3. Mono-octyl-acid-pyrophosphate
4. Di-methyl-tri-polyphosphoric acid
5. Mono-octyl-hemi-phosphoric acid
6. Mono-ethyl-di-meta-phosphoric acid
7. Any of the above modified organo phosphoric acids where the phenyl group is substituted for the octyl, methyl or ethyl group.

The mineral acids and unsubstituted acids that are blended or mixed with the organo phosphoric acids above described include hydrochloric acid, sulfuric acid, phosphoric acid and hydrates of phosphorous oxides. The relative proportions or ratios of the organo phosphoric acids to the mineral acids or unsubstituted phosphoric acids will, of course, depend upon the strengths or concentrations of the aqueous acid solutions and upon the particular foaming phenolic resin formulations in which they are to be employed. In general, the ratio range in percent by weight is between 10 and 90% of the mineral or unsubstituted acid to between 90 and 10% of the organo phosphoric acid. The oxy-acids of phosphorous and their partial organic esters, which we have sometimes referred to as the organo phosphoric acids, serve to control or slow down the rate of reaction of the reactant phenol-aldehyde foaming mixtures while the mineral acids or unsubstituted phosphoric acids tend to produce a rather rapid reaction but a greater degree of cure. Accordingly, the ratios or relative proportions of the acids may be selected or chosen to obtain the rate of reaction best suited for the particular foaming phenol-aldehyde mixture and for the particular use or application of the same.

The abovementioned diluents for the acid blend catalysts may be glycerol, di-alkylene glycols, polyethylene or polypropylene glycols. These diluents serve to assist in controlling the rate of rise or reaction of the foaming phenol-aldehyde mixtures and may be used in the proportion of from 5 to 50% by weight of the total catalyst mixture, depending upon the concentration or strength of the aqueous carrier and upon the type of phenol-aldehyde resin reactant mixture. The remainder or balance of the catalyst is water which in practice is in the proportion of from 5 to 60% by weight of the total catalyst mixture.

The following are typical examples of the catalysts of the invention such as above described; the proportions in these and the other examples being in percentages by weight:

*Catalyst A-1*

| | Percent |
|---|---|
| Mono-ethyl-ortho-phosphoric acid | 18 to 10 |
| Hydrochloric acid (100%) | 34 to 42 |
| Water | 40 to 56 |

*Catalyst A-2*

| | |
|---|---|
| Mono-glycero-ortho-phosphoric acid | 18 to 10 |
| Phosphoric acid | 34 to 42 |
| Water | 40 to 56 |

*Catalyst A-3*

| | |
|---|---|
| Di-methyl-acid-pyrophosphate | 18 to 10 |
| Sulfuric acid | 34 to 42 |
| Water | 40 to 56 |

The following are typical illustrative examples of the reactant foaming compositions or mixtures of the invention employing or embodying catalysts such as above described:

EXAMPLE 1

| | Percent |
|---|---|
| Resin No. 1 | 85 |
| Aluminum powder | 2 |
| Catalyst A-1 | 13 |

EXAMPLE 2

| | |
|---|---|
| Resin No. 1 | 83 |
| Aluminum powder | 2 |
| Catalyst A-1 | 13 |
| Lecithin | 2 |

EXAMPLE 3

| | |
|---|---|
| Resin No. 7 | 85 |
| Aluminum powder | 2 |
| Catalyst A-2 | 13 |

In Examples 1, 2 and 3 the ratio of resin to catalyst may range between 65% by weight of the resin to 35% by weight of the catalyst and 90% by weight of the resin to 10% by weight of the catalyst.

As previously described or mentioned, we have found that unreacted ester components may be blended or mixed with the prereacted esters or partial esters of polyhydric alcohols and acids of anhydro bases of phosphorous to constitute catalysts which are comparable to or substantially identical with the above described catalysts when employed in the reactant resol-type of phenolic resin mixtures. The following are examples of such catalysts:

*Catalyst B-1*

| | Percent |
|---|---|
| Mono-octyl-acid pyrophosphate | 10 to 14 |
| Phosphoric acid (100%) | 18 to 14 |
| Glycerol | 44 |
| Water | 24 to 32 |

*Catalyst B-2*

| | |
|---|---|
| Mono-ethyl-di-meta di-phosphoric acid | 10 to 25 |
| Hydrochloric acid (100%) | 40 to 25 |
| Ethylene glycol | 20 to 30 |
| Water | 45 to 5 |

*Catalyst B-3*

| | |
|---|---|
| Di-methyl-tri-poly phosphoric acid | 10 to 25 |
| Di-ethylene glycol | 40 to 25 |
| Sulfuric acid (100%) | 30 to 15 |
| Water | 5 to 50 |

The following are illustrative examples employing catalysts of this type:

EXAMPLE 4

| | Percent |
|---|---|
| Resin No. 1 | 80 |
| Aluminum powder | 2 |
| Catalyst B-1 | 18 |

EXAMPLE 5

| | |
|---|---|
| Resin No. 1 | 85 |
| Aluminum powder | 2 |
| Catalyst B-1 | 12 |
| Cephalin | 1 |

EXAMPLE 6

| | |
|---|---|
| Resin No. 7 | 80 |
| Zinc powder | 3 |
| Catalyst B-2 | 17 |

EXAMPLE 7

| | |
|---|---|
| Resin No. 6 | 75 |
| Aluminum powder | 3 |
| Catalyst B-3 | 20 |
| Lecithin | 2 |

EXAMPLE 8

| | |
|---|---|
| Resin No. 1 | 50 |
| Resin No. 6 | 26 |
| Aluminum powder | 2 |
| Catalyst B-3 | 22 |

We have also found that catalysts containing unreacted ester components in conjunction with the mineral acids serve in the reactant foaming phenolic resin mixtures in the same manner as the earlier described catalysts. The following are examples of this class of catalysts of the invention:

*Catalyst C-1*

| | Percent |
|---|---|
| Glycerol | 20 |
| Ortho-phosphoric acid (100%) | 10 to 20 |
| Water | 30 to 50 |
| Hydrochloric acid (100%) | 30 to 20 |

*Catalyst C-2*

| | Percent |
|---|---|
| Diethylene glycol | 20 |
| Orthophosphoric acid (100%) | 10 to 20 |
| Water | 30 to 50 |
| Hydrochloric acid (100%) | 30 to 20 |

The following are illustrative examples of the foaming reactant phenolic resin compositions of the invention incorporating catalysts of this type:

EXAMPLE 9

| | Percent |
|---|---|
| Resin No. 8 | 85 |
| Aluminum powder | 2 |
| Catalyst C-1 | 13 |

EXAMPLE 10

| | |
|---|---|
| Resin No. 1 | 85 |
| Aluminum powder | 1 |
| Catalyst C-1 | 12 |
| Lecithin | 2 |

EXAMPLE 11

| | |
|---|---|
| Resin No. 6 | 80 |
| Aluminum powder | 3 |
| Catalyst C-2 | 17 |

In Examples 4 to 11 inclusive, the ratio of the resin to the catalyst may range between 65% by weight of the resin to 35% by weight of the catalyst and 90% by weight of the resin to 10% by weight of the catalyst.

In preparing the cellular phenolic resin products of the invention the selected catalyst is prepared as one "package" and the resin or resol(s) forms the other "package." Where an ester phosphatide is to be used it is preferably incorporated in the catalyst as indicated above. The gassing agent and any additives or fillers are also preferably incorporated in the resin "package." When it is desired to prepare and apply or pour the foamed product the "packages" just described are thoroughly mixed together and the resultant reactant mixture is then applied by pouring, brushing, blading, dipping, or the like. The mixture foams and reacts at atmospheric pressure and room temperature to produce the cellular product, the reaction being accompanied by exothermic heat which sets the foam or cellular mass. The product may be post cured for several hours at a slightly elevated temperature, say at a temperature of from 150° F. to 250° F.

It should be understood that the invention is not to be based upon or dependent upon the theories which we have expressed. Nor is the invention to be regarded as limited to the express procedure or material set forth, these details being given only by way of illustration and to aid in clarifying the invention. We do not regard such specific details as essential to the invention except insofar as they are expressed by way of limitation in the following claims in which it is our invention to claim all novelty inherent in the invention as broadly as is permissible in view of the prior art.

We claim:

1. The cellular plastic material which is the product of reaction of a foaming flowable composition comprising on a percentage by weight basis from about 60 to about 90% of an acid catalyzable water miscible phenol-aldehyde resol, from about 0.2 to about 10% of a water insoluble gassing agent that liberates gas when reacted with an acid selected from the group of metallic powders consisting of aluminum powder, zinc powder, iron powder and magnesium powder, and a catalyst comprising from 10 to 18% of an organo phosphoric acid selected from the group consisting of—glycero phosphoric acid, di-methyl-acid-pyrophosphate, mono-octyl-acid-pyrophosphate, di-methyl-tri-polyphosphoric acid, mono-octyl-hemi-phosphoric acid, mono-ethyl-di-meta-phosphoric acid; a mineral acid in the proportion of from 10 to 90% and from 90 to 10% of the organo phosphoric acid, from 5 to 60% water, and from 5 to 50% by weight of the catalyst of a polyhydric alcohol the catalyst being in the proportion range of from 35% of the catalyst to 65% of the resin to 10% of the catalyst to 90% of the resin.

2. The cellular plastic material which is the product of reaction of a foaming flowable composition comprising on a percentage by weight basis from about 60 to about 90% of an acid catalyzable water miscible phenol-aldehyde resol, from about 0.2 to about 10% of a water insoluble gassing agent that liberates gas when reacted with an acid selected from the group of metallic powders consisting of aluminum powder, zinc powder, iron powder and magnesium powder, and a catalyst comprising from 10 to 18% of an organo phosphoric acid selected from the group consisting of—glycero phosphoric acid, di-methyl-acid-pyrophosphate, mono-octyl-acid-pyrophosphate, di-methyl-tri-polyphosphoric acid, mono-octyl-hemi-phosphoric acid, mono-ethyl-di-meta-phosphoric acid; an oxy acid of phosphorous in the proportion of from 10 to 90% and from 90 to 10% of the organo phosphoric acid and from 5 to 60% water, the catalyst being in the proportion range of from 35% of the catalyst to 65% of the resin to 10% of the catalyst to 90% of the resin.

3. The cellular plastic material which is the product of reaction of a foaming flowable composition comprising on a percentage by weight basis from about 60 to about 90% of an acid catalyzable water miscible phenol-aldehyde resol, from about 0.2 to about 10% of a water insoluble gassing agent that liberates gas when reacted with an acid selected from the group of metallic powders consisting of aluminum powder, zinc powder, iron powder and magnesium powder, and a catalyst comprising from 10 to 18% of an organo phosphoric acid selected from the group consisting of glycero phosphoric acid, di-methyl-acid-pyrophosphate, mono-octyl-acid-pyrophosphate, di-methyl-tri-polyphosphoric acid, mono-octyl-hemi-phosphoric acid, mono-ethyl-di-meta-phosphoric acid; a mineral acid in the proportion ratio of from 10 to 90% and from 90 to 10% of the organo phosphoric acid, and about 5 to 60% water, the catalyst being in the proportion range of from 35% of the catalyst to 65% of the resin to 10% of the catalyst to 90% of the resin.

4. The cellular plastic material which is the product of reaction of a foaming flowable composition on a percentage by weight basis from about 60 to about 90% of an acid catalyzable water miscible phenol-aldehyde resol, from about 0.2 to about 10% of a water insoluble gassing agent that liberates gas when reacted with an acid selected from the group of metallic powders consisting of aluminum powder, zinc powder, iron powder and magnesium powder, and a catalyst comprising from 10 to 18% of an organo phosphoric acid selected from the group consisting of glycero phosphoric acid, di-methyl-acid-pyrophosphate, mono-octyl-acid-pyrophosphate, di-methyl-tri-polyphosphoric acid, mono-octyl-hemi-phosphoric acid, mono-ethyl-di-meta-phosphoric acid; an acid selected from the group consisting of hydrochloric acid, sulfuric acid, phosphoric acid and hydrates of phosphorous oxides in the proportion of from 10 to 90% and 90 to 10% of the organo phosphoric acid and from about 5 to 60% water, the catalyst being in the proportion range of from 35% of the catalyst to 65% of the resin to 10% of the catalyst to 90% of the resin.

5. The cellular plastic material which is the product of reaction of a foaming flowable composition comprising on a percentage by weight basis from about 60 to about 90% of an acid catalyzable water miscible phenol-aldehyde resol, from about 0.2 to about 10% of a water insoluble gassing agent that liberates gas when reacted with an acid selected from the group consisting of aluminum powder, zinc powder, iron powder and magnesium powder, and a catalyst comprising from 10 to 18% of an organo phosphoric acid selected from the group consisting of: glycero phosphoric acid, di-methyl-acid-pyrophosphate, mono-octyl-acid pyrophosphate, di-methyl-tri-polyphosphoric acid, mono-octyl-hemi-phosphoric acid, mono-ethyl-di-meta-phosphoric acid; an acid selected from the group consisting of hydrochloric acid, sulfuric acid, phosphoric acid and hydrates of phosphorous oxides in the proportion of from 10 to 90% and from 90 to 10% of the organo phosphoric acid, and from about 5 to 60% water, the catalyst being in the proportion range of from 35% of the catalyst to 65% of the resin to 10% of the catalyst to 90% of the resin.

6. The cellular plastic material which is the product of reaction of a foaming flowable composition comprising on a percentage by weight basis from about 60 to 90% of an acid catalyzable water miscible phenol-aldehyde resol, from about 0.2 to about 10% of a water insoluble gassing agent that liberates gas when reacted with an acid selected from the group of metallic powders consisting of aluminum powder, zinc powder, iron powder and magnesium powder, and a catalyst comprising from 10 to 18% of an organo phosphoric acid selected from the group consisting of glycero phosphoric acid, di-methyl-acid-pyrophosphate, mono-octyl-acid-pyrophosphate, di-methyl-tri-polyphosphoric acid, mono-octyl-hemi-phosphoric acid, mono-ethyl-di-meta-phosphoric acid; an oxy acid of phosphorous in the proportion of from 10 to 90% and from 90 to 10% of the organo phosphoric acid, from 5 to 50% by weight of the catalyst of a polyhydric alcohol and from about 5 to 60% water, the catalyst being in the proportion range of from 35% of the catalyst to 65% of the resin to 10% of the catalyst to 90% of the resin.

7. The cellular plastic material which is the product of reaction of a foaming composition comprising on a percentage by weight basis about 85% of an acid catalyzable water miscible phenol aldehyde resol, about 2% aluminum powder, and about 13% of a catalyst comprising from 18 to 10% mono-ethyl-ortho-phosphoric acid, from 34 to 42% hydrochloric acid and from 40 to 56% water.

8. The cellular plastic material which is the product of reaction of a foaming composition comprising on a percentage by weight basis about 83% of an acid catalyzable water miscible phenol-aldehyde resol, about 2% aluminum powder, about 2% lecithin, and about 13% of a catalyst comprising from about 18 to 10% mono-ethyl-ortho-phosphoric acid, about 34 to 42% hydrochloric acid, and about 40 to 56% water.

9. The cellular plastic material which is the product of reaction of a foaming composition comprising on a percentage by weight basis about 80% of an acid catalyzable water miscible phenol-aldehyde resol, about 2% aluminum powder and about 18% of a catalyst comprising from about 10 to 14% mono-octyl-acid pyrophosphate, from about 18 to 14% phosphoric acid, about 44% glycerol, and from about 24 to 32% water.

10. The cellular plastic material which is the product of reaction of a foaming flowable composition comprising on a percentage by weight basis from about 60 to about 90% of an acid catalyzable water miscible phenol-aldehyde resol, from about 0.2 to about 10% of a water insoluble gassing agent that liberates gas when reacted with an acid selected from the group of metallic powders consisting of aluminum powder, zinc powder, iron powder and magnesium powder, from about ⅛ to 10% of an ester phosphatide selected from the group consisting of lecithin and cephalin and a catalyst comprising from 10 to 18% of an organo phosphoric acid selected from the group consisting of glycero phosphoric acid, di-methyl-acid-pyrophosphate, mono-octyl-acid-pyrophosphate, di-methyl-tri-polyphosphoric acid, mono-octyl-hemi-phosphoric acid, mon-ethyl-di-meta-phosphoric acid; a mineral acid in the proportion ratio of from 10 to 90% and from 90 to 10% of the organo phosphoric acid, and about 5 to 60% water, the catalyst being in the proportion range of from 35% of the catalyst to 65% of the resin to 10% of the catalyst to 90% of the resin.

11. The cellular plastic material which is the product of reaction of a foaming flowable composition comprising on a percentage by weight basis from about 60 to 90% of an acid catalyzable water miscible phenol-aldehyde resol, from about 0.2 to about 10% of a water insoluble gassing agent that liberates gas when reacted with an acid selected from the group consisting of aluminum powder, zinc powder, iron powder and magnesium powder, from about ⅛ to 10% of an ester phosphatide selected from the group consisting of lecithin and cephalin, and a catalyst comprising from 10 to 18% of an organo phosphoric acid selected from the group consisting of: glycero phosphoric acid, di-methyl-acid-pyrophosphate, mono-octyl-acid-pyrophosphate, di-methyl-tri-polyphosphoric acid, mono-octyl-hemi-phosphoric acid, mono-ethyl-di-meta-phosphoric acid; an oxy acid of phosphorous in the proportion of from 10 to 90% and from 90 to 10% of the organo phosphoric acid, from 5 to 50% by weight of the catalyst of a polyhydric alcohol and from about 5 to 60% water, the catalyst being in the proportion range of from 35% of the catalyst to 65% of the resin to 10% of the catalyst to 90% of the resin.

12. The cellular plastic material which is the product of reaction of the foaming composition comprising on an approximate percentage by weight basis from 60 to 90% of an acid catalyzable water miscible phenol-aldehyde resol, from 0.2 to 10% of a water insoluble gassing agent that liberates gas when reacted with an acid selected from the group consisting of aluminum powder, zinc powder, iron powder and magnesium powder, and a catalyst in the proportion range of from 35% of the catalyst to 65% of the resin to 10% of the catalyst to 90% of the resin, the catalyst comprising from 10 to 14% mono-octyl-acid pyrophosphate, from 18 to 14% phosphoric acid, about 44% glycerol and from 24 to 32% water.

13. The cellular plastic material which is the product of reaction of the foaming composition comprising on an approximate percentage by weight basis from 60 to 90% of an acid catalyzable water miscible phenol-aldehyde resol, from 0.2 to 10% of a water insoluble gassing agent that liberates gas when reacted with an acid selected from the group consisting of aluminum powder, zinc powder, iron powder and magnesium powder, from ⅛ to 10% of an ester phosphatide selected from the group consisting of lecithin and cephalin, and a catalyst in the proportion range of from 35% of the catalyst to 65% of the resin to 10% of the catalyst to 90% of the resin, the catalyst comprising from 10 to 14% mono-octyl-acid pyrophosphate, from 18 to 14% phosphoric acid, about 44% glycerol and from 24 to 32% water.

14. The cellular plastic material which is the product of reaction of a foaming flowable composition comprising on a percentage by weight basis from about 60 to 90% of an acid catalyzable water miscible phenol-aldehyde resol, from about 0.2 to about 10% of a water insoluble gassing agent that liberates gas when reacted with an acid selected from the group consisting of aluminum powder, zinc powder, iron powder and magnesium powder, from about ⅛ to 10% of lecithin, and a catalyst comprising from 10 to 18% of an organo phosphoric acid selected from the group consisting of: glycero phosphoric acid, di-methyl-acid-pyrophosphate, mono-octyl-acid-pyrophosphate, di-methyl-tri-polyphosphoric acid, mono-octyl-hemi-phosphoric acid, mono-ethyl-di-meta-phosphoric acid; an oxy acid of phosphorous in the proportion of from 10 to 90% and from 90 to 10% of the organo phosphoric acid, from 5 to 50% by weight of the catalyst of a polyhydric alcohol and from about 5 to 60% water, the catalyst being in the proportion range of from 35% of the catalyst to 65% of the resin to 10% of the catalyst to 90% of the resin.

References Cited in the file of this patent

UNITED STATES PATENTS

| 2,272,847 | Macht | Feb. 10, 1942 |
|---|---|---|
| 2,398,703 | Gardner | Apr. 16, 1946 |
| 2,446,429 | Nelson et al. | Aug. 3, 1948 |
| 2,529,512 | Ott | Nov. 14, 1950 |
| 2,544,483 | Baum | Mar. 6, 1951 |
| 2,582,228 | Brinkema | Jan. 15, 1952 |
| 2,653,139 | Sterling | Sept. 22, 1953 |

FOREIGN PATENTS

| 410,200 | Canada | Jan. 26, 1943 |